US011631230B2

(12) United States Patent
Naruse et al.

(10) Patent No.: US 11,631,230 B2
(45) Date of Patent: *Apr. 18, 2023

(54) METHOD, DEVICE, SYSTEM AND COMPUTER-PROGRAM PRODUCT FOR SETTING LIGHTING CONDITION AND STORAGE MEDIUM

(71) Applicant: OMRON Corporation, Kyoto (JP)

(72) Inventors: Yosuke Naruse, Kyoto (JP); Masashi Kurita, Kizugawa (JP)

(73) Assignee: OMRON Corporation, Kyoto (JP)

(*) Notice: Subject to any disclaimer, the term of this patent is extended or adjusted under 35 U.S.C. 154(b) by 247 days.

This patent is subject to a terminal disclaimer.

(21) Appl. No.: 16/970,376

(22) PCT Filed: Mar. 6, 2018

(86) PCT No.: PCT/IB2018/051413
§ 371 (c)(1),
(2) Date: Aug. 16, 2020

(87) PCT Pub. No.: WO2019/171124
PCT Pub. Date: Sep. 12, 2019

(65) Prior Publication Data
US 2020/0410270 A1    Dec. 31, 2020

(51) Int. Cl.
G06V 10/141    (2022.01)
G01N 21/88     (2006.01)
(Continued)

(52) U.S. Cl.
CPC ....... *G06V 10/141* (2022.01); *G01N 21/8806* (2013.01); *G06N 3/04* (2013.01);
(Continued)

(58) Field of Classification Search
CPC ............. G06V 10/141; G01N 21/8806; G01N 2021/845; G01N 2021/8887;
(Continued)

(56) References Cited

U.S. PATENT DOCUMENTS 10,311,559 B2 *  6/2019  Takimoto ............... G06F 17/18
10,504,020 B2 * 12/2019  Trenholm ............... G06F 8/30
(Continued)

FOREIGN PATENT DOCUMENTS

CN    101292263    10/2008
CN    103868935     6/2014
(Continued)

OTHER PUBLICATIONS

"Office Action of Japan Counterpart Application" with English translation thereof, dated May 10, 2022, p. 1-p. 4.
(Continued)

*Primary Examiner* — Samir A Ahmed
(74) *Attorney, Agent, or Firm* — JCIPRNET

(57) ABSTRACT

The present disclosure relates to a method, device, system and computer-program product for setting a lighting condition when an object is checked and a storage medium. The method includes that: the object is lighted by light sources capable of changing lighting parameters, and the object is captured by an image sensor in such lighting parameters to obtain captured images, wherein the object has known label data; and a part of or all of the captured images and the corresponding label data of the object are applied to learning of a machine learning model, and the lighting condition and the check algorithm parameters of the machine learning model is set simultaneously by optimizing both the lighting parameters and the check algorithm parameters, on the basis of a comparison result between an estimation result of the machine learning model and the label data. Therefore, operations are simplified.

20 Claims, 9 Drawing Sheets

(51) Int. Cl.
*G06N 3/04* (2023.01)
*G06N 3/08* (2023.01)
*G06T 7/00* (2017.01)
*G01N 21/84* (2006.01)

(52) U.S. Cl.
CPC ............... G06N 3/08 (2013.01); G06T 7/001 (2013.01); *G01N 2021/845* (2013.01); *G01N 2021/8887* (2013.01); *G01N 2201/1296* (2013.01); *G06T 2207/20081* (2013.01); *G06T 2207/20084* (2013.01); *G06T 2207/30108* (2013.01)

(58) Field of Classification Search
CPC .... G01N 2201/1296; G06N 3/04; G06N 3/08; G06T 7/001; G06T 2207/20081; G06T 2207/20084; G06T 2207/30108
See application file for complete search history.

(56) References Cited

U.S. PATENT DOCUMENTS

| | | | |
|---|---|---|---|
| 11,240,441 B2* | 2/2022 | Naruse | G06N 20/00 |
| 2001/0048522 A1 | 12/2001 | Yonezawa | |
| 2013/0077850 A1* | 3/2013 | Hirai | G06T 7/0004 |
| | | | 382/149 |
| 2016/0034809 A1* | 2/2016 | Trenholm | G06N 3/02 |
| | | | 706/20 |
| 2017/0069075 A1* | 3/2017 | Okuda | G06V 10/764 |
| 2017/0323437 A1* | 11/2017 | Takimoto | G06F 17/18 |

FOREIGN PATENT DOCUMENTS

| | | |
|---|---|---|
| CN | 106503724 | 3/2017 |
| CN | 107576618 | 1/2018 |
| EP | 2887055 | 6/2015 |
| JP | 2001343336 | 12/2001 |
| JP | 2004191112 | 7/2004 |
| JP | 2012189390 | 10/2012 |
| JP | 2017122580 | 7/2017 |
| WO | 2015188275 | 12/2015 |

OTHER PUBLICATIONS

"International Search Report (Form PCT/ISA/210) of PCT/IB2018/051413", dated Sep. 19, 2018, pp. 1-4.

"Written Opinion of the International Searching Authority (Form PCT/ISA/237) of PCT/B2018/051413", dated Sep. 19, 2018, pp. 1-6.

"Office Action of Japan Counterpart Application" with English translation thereof, dated Oct. 26, 2021, p. 1-p. 10.

Office Action of China Counterpart Application, with English translation thereof, dated Feb. 13, 2023, pp. 1-22.

* cited by examiner

METHOD, DEVICE, SYSTEM AND COMPUTER-PROGRAM PRODUCT FOR SETTING LIGHTING CONDITION AND STORAGE MEDIUM

CROSS-REFERENCE TO RELATED APPLICATION

This application is a 371 application of the International PCT application serial no. PCT/IB2018/051413, filed on Mar. 6, 2018. The entirety of the above-mentioned patent application is hereby incorporated by reference herein and made a part of this specification.

TECHNICAL FIELD

The present disclosure relates to a method, device, system and computer-program product for setting a lighting condition during industrial detection and a storage medium.

BACKGROUND

Product appearance checking in a production field is one of fields where replacement of humans with machines is implemented least, and is an important technical problem, which must be solved, about automation for reduction of labor force in the future. In recent years, along with development of an artificial intelligence and machine learning technology represented by deep learning, a check automation technology is improved by leap and bounds. However, in appearance checking, machine vision and the like, the most troublesome flow during establishment of a check system is design of an imaging system including optimal design of lighting. There exists the following problem: when an operator manually performs optimal design of lighting, for dealing with individual differences of workpieces, it is necessary to change the workpieces determined as objects and alternately and repeatedly perform manual-regulation-based optimization of lighting and regulation of a check algorithm at the same time to achieve expected detection performance, which is very time-consuming. Moreover, there also exists the following problem: when lighting is regulated to be easily observed by the operator, optimal checking accuracy may not always be achieved.

In a conventional art for solving the problems, there is reported a method for calculating an evaluation reference according to a captured image and repeatedly calculating imaging and lighting parameters maximizing/minimizing it (Patent 1). However, according to the method, optimization of an evaluation value calculated according to a captured image of a single workpiece which is currently captured may be implemented only, and optimization of a recognizer based on machine learning, for example, learning of differences between multiple workpieces, may not be implemented.

Moreover, there also exists the following problem: there may exist a large number of combined imaging and lighting parameters, and changing an imaging and lighting condition, performing imaging and performing optimization at the same time may require relatively long time to be costed.

In addition, the abovementioned problems exist not only during product appearance checking in a production field, but also in other judgment devices (such as a facial recognition system) that may use the captured images of lit objects as inputs to make various judgments by means of machine learning.

Patent literature 1: EP2887055A1

SUMMARY

The present disclosure is adopted to solve at least part or all of the foregoing problems.

The present disclosure discloses a method for optimizing parameters of a check algorithm under the condition that the parameters of the machine-learning-based check algorithm include design parameters of lighting. Therefore, a user may directly perform optimization of lighting and optimization of the check algorithm at the same time in a manner of maximizing a Loss value (correct ratio under a judgment condition) of the check algorithm.

(1) According to an aspect of the present disclosure, a method for setting a lighting condition when an object is checked is disclosed, wherein a check module including a machine learning model is used to check the object, the machine learning model being generated by using learning data comprising images, and the method is characterized by including that: the object is lighted by light sources capable of changing lighting parameters, the lighting parameters specifying the lighting condition when the object is captured, and the object is captured by an image sensor under multiple such lighting parameters to obtain multiple captured images corresponding to the multiple lighting parameters, wherein the object has known label data; and a part of or all of the multiple captured images corresponding to the multiple lighting parameters and the corresponding label data of the object are applied to learning of the machine learning model, and both the lighting condition and the check algorithm parameters of the machine learning model is set by simultaneously optimizing both the lighting parameters and the check algorithm parameters on the basis of a comparison result between an estimation result of the machine learning model and the label data of the object.

Therefore, the lighting condition adopted when the check module is used to check the object is set on the basis of the comparison result between the estimation result of the machine learning model and the label data of the object, optimization of the lighting parameters and check algorithm parameters of the machine learning model may be performed at the same time, and operations are simplified.

(2) According to another aspect of the present disclosure, a method for setting a lighting condition when an object is checked is disclosed, wherein a check module including a machine learning model is used to check the object, the machine learning model being generated by using learning data comprising images, and the method is characterized by including that: the object is lighted by light sources capable of changing lighting parameters, the lighting parameters specifying the lighting condition when the object is captured, and the object is captured by an image sensor under multiple such lighting parameters to obtain multiple captured images corresponding to the multiple lighting parameters, wherein the object has known label data; and a part of or all of the multiple captured images corresponding to the multiple lighting parameters are applied to the machine learning model which has already performed learning, and the lighting condition is set by optimizing only a selection of the predetermined lighting parameters on the basis of a comparison result between an estimation result of the machine learning model and the label data of the object.

In the foregoing method, in a manner of determining check algorithm parameters at first and then determining the check lighting parameters, a system calculation amount during learning of the machine learning model may be reduced, a system load may be reduced, and a setting operation over the lighting parameters may be simplified.

(3) In the foregoing method, the operation that a part of or all of the multiple captured images corresponding to the multiple lighting parameters are applied to the machine learning model which has performed learning includes that: learning data including the captured images and the corresponding label data of the object is applied to additional learning of the machine learning model to update a part of or all of check algorithm parameters of the machine learning model, wherein the label data represents checked features of the object; and both the selection of the lighting parameters and a part of or all of the check algorithm parameters of the machine learning model are optimized to make the estimation result of the machine learning model consistent with the label data.

In such a manner, a part of or all of the check algorithm parameters and the check lighting parameters may be simultaneously optimized in the second step of the method, so that the machine learning model may obtain a better learning result.

(4) In the foregoing method, when the lighting condition is set, a number of the captured images applied to the machine learning model which has already performed learning in order to find the optimal lighting condition is smaller than a number of the captured images applied to learning of the machine learning model.

Therefore, learning time may be shortened.

(5) In the foregoing method, the lighting parameters include luminous positions and luminous intensity of the light sources.

Therefore, the luminous positions and luminous intensity of the light sources may both be changed to change the lighting parameters.

(6) In the foregoing method, the operation that the lighting condition adopted when the check module is used to check the object is set includes that: selecting the lighting parameters that minimize the loss function representing the comparison result, wherein the lighting parameters are variables of the loss function, wherein the selecting comprises: selecting the lighting parameters that minimize the loss average of the loss function for the lighting parameters of a predetermined range.

Here, the lighting parameters of the predetermined range are considered, so that robustness to an environmental change when the object is checked may be improved.

(7) According to another aspect of the present disclosure, various devices corresponding to each foregoing method and for setting a lighting condition when an object is checked are further disclosed, which may achieve the same effect as each foregoing method.

(8) According to another aspect of the present disclosure, a system for setting a lighting condition when an object is checked is further disclosed, which may include a processing unit and may be configured to execute any foregoing method.

(9) According to another aspect of the present disclosure, a computer-program product is further disclosed, which is executed to execute any foregoing method.

(10) According to another aspect of the present disclosure, a storage medium is further disclosed, in which a program is stored, the program being executed to execute any foregoing method.

The system, the computer product program and the storage medium may also achieve the same effect as each foregoing method.

Technical Effect

Two effects of the present disclosure are listed substantially. At first, design hours may be shortened, a systematic design may be obtained, and individualized skilling represented by dependence of performance on skills of staff is prevented. Second, from the point of performance, direct optimization of the whole capturing system and image processing system may be implemented only from the angle of checking accuracy (accepted/rejected product judgment or measured value), for example, a good lighting design for check algorithms and the check algorithm most suitable for such lighting.

BRIEF DESCRIPTION OF THE DRAWINGS

The drawings described herein are used to provide a further understanding of the present disclosure and constitute a part of the present application. The schematic embodiments of the present disclosure and the descriptions thereof are used to explain the present disclosure, and do not constitute improper limitations to the present disclosure. In the drawings.

Figure 4:
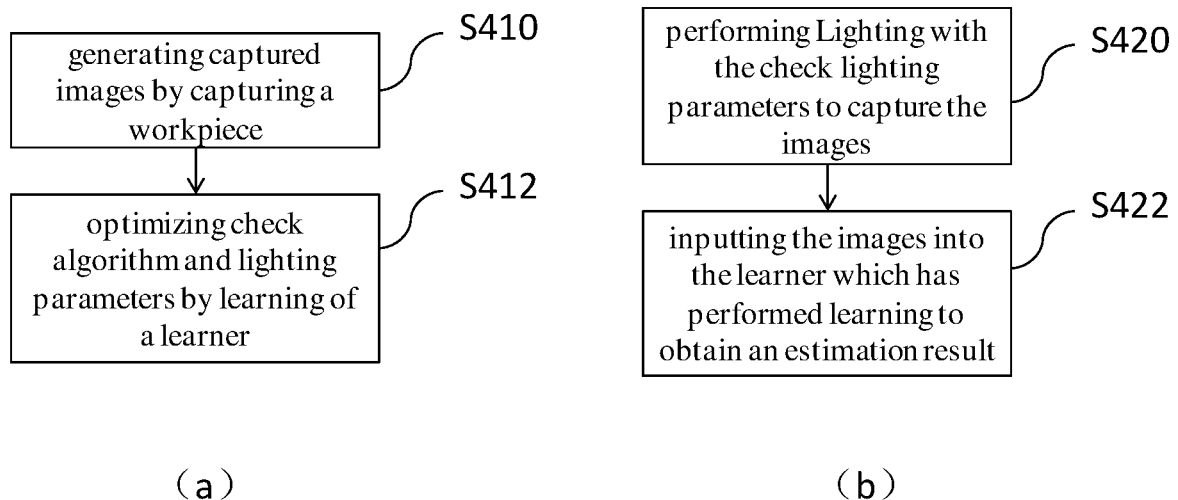
Figure 5:
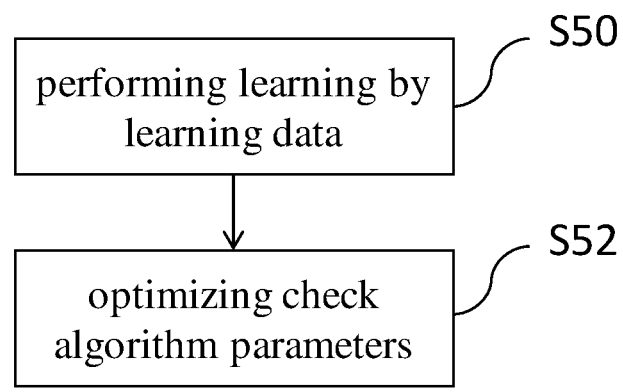
Figure 6:
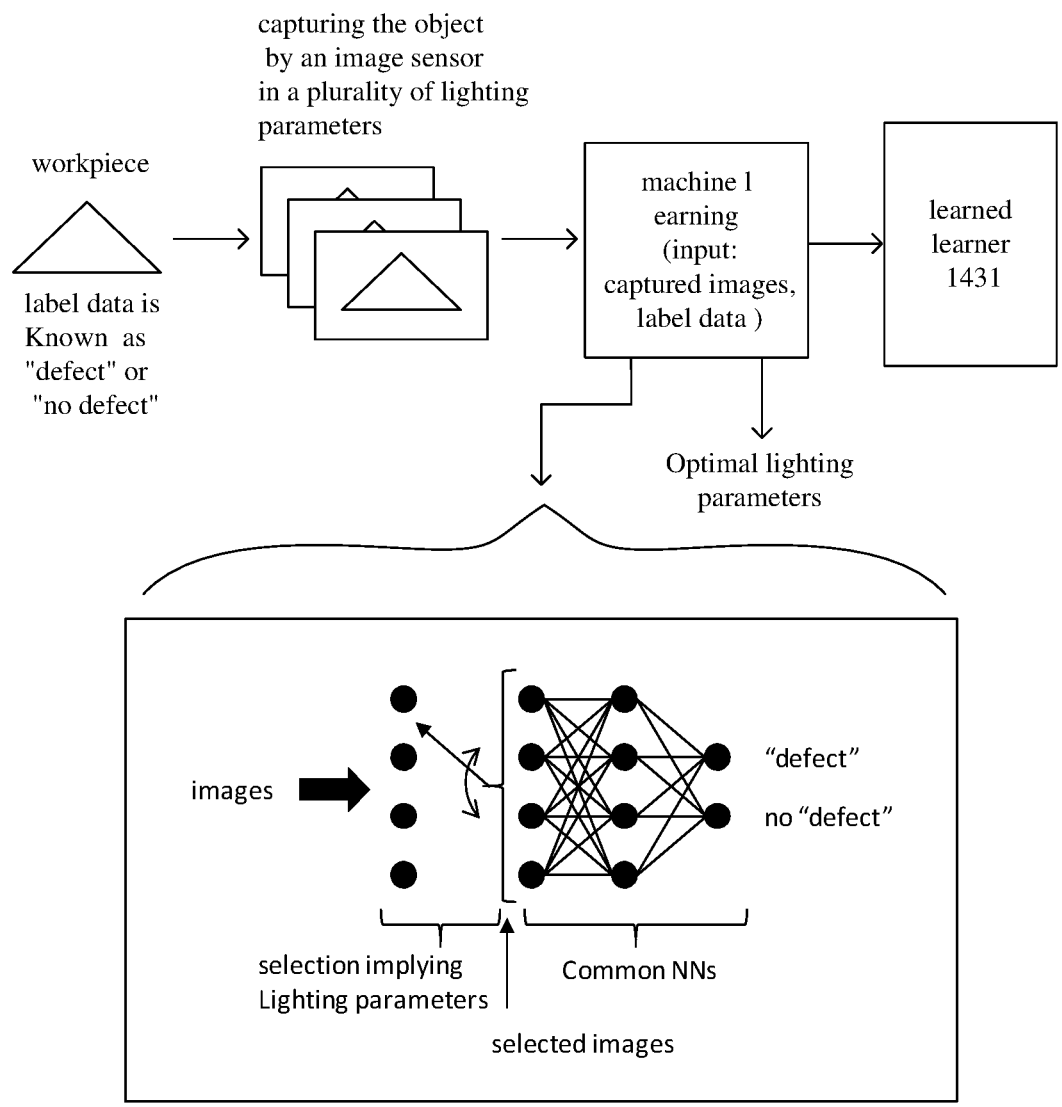
Figure 7:
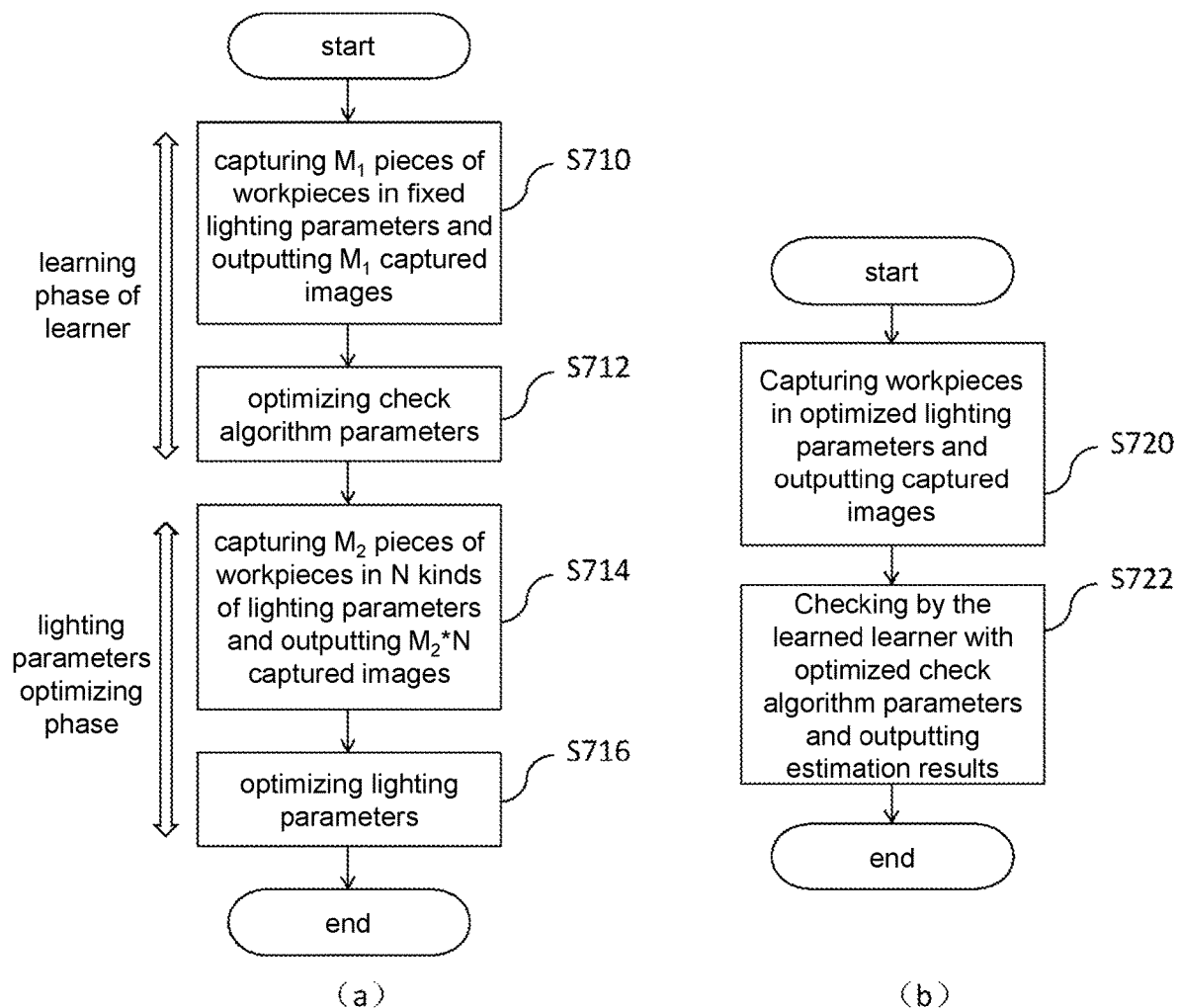
Figure 8:
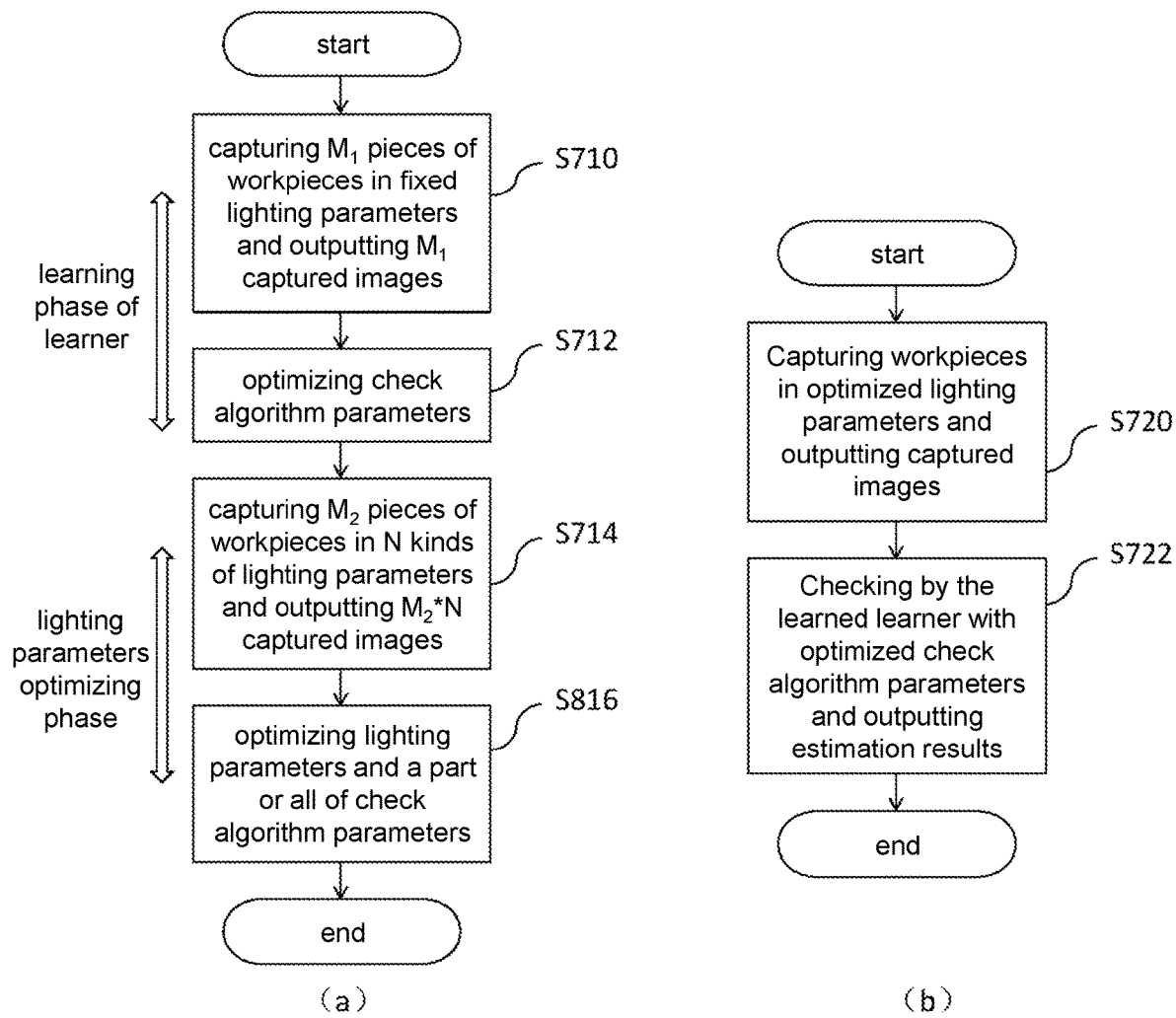
Figure 9:
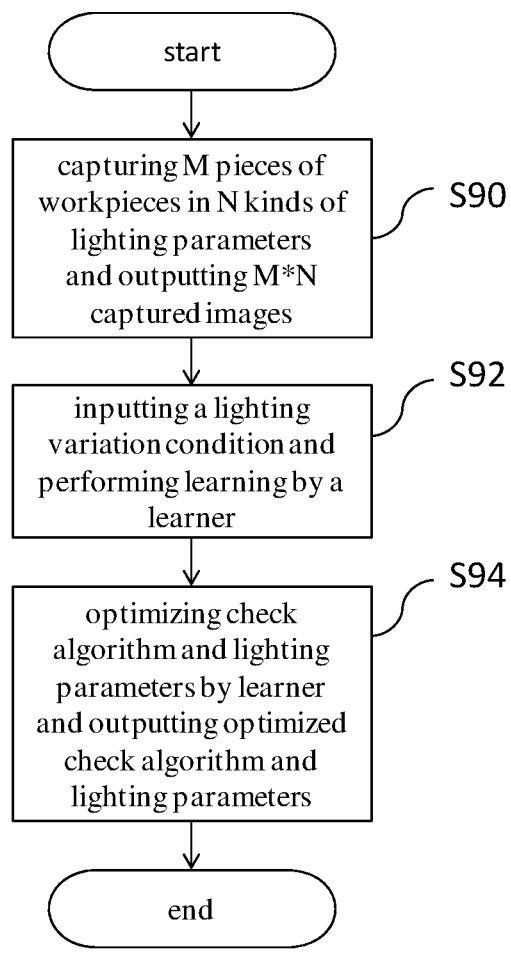
Figure 10:
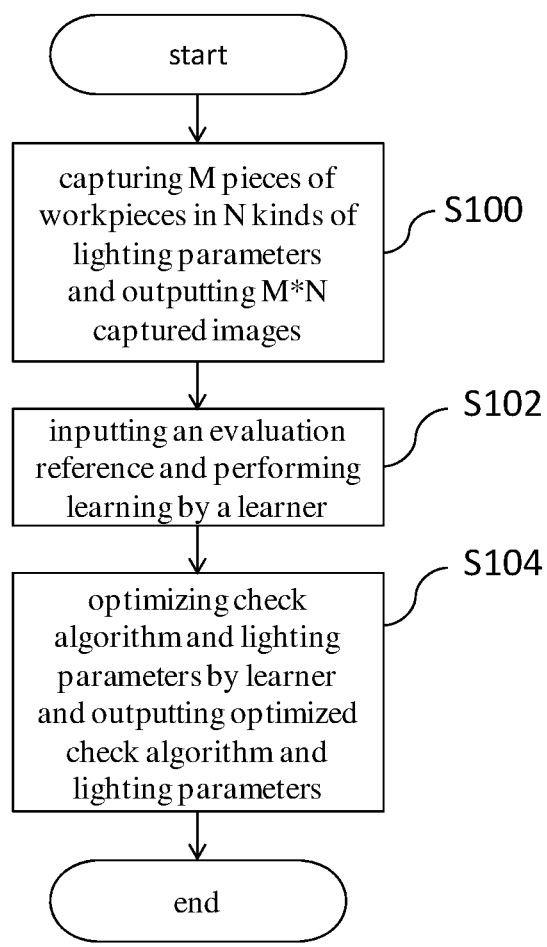

(a) and (b) of FIG. 4 are respectively flowcharts of a learning stage and check stage of a machine learning model in a method for setting a lighting condition according to an implementation mode of the present disclosure;

FIG. 5 is a flowchart of a method for setting a lighting condition according to an implementation mode of the present disclosure;

FIG. 6 is a schematic flowchart of the method for setting a lighting condition shown in FIG. 4 and FIG. 5;

(a) and (b) of FIG. 7 are respectively flowcharts of a learning stage and check stage of a machine learning model in a method for setting a lighting condition according to another implementation mode of the present disclosure;

(a) and (b) of FIG. 8 are respectively flowcharts of a learning stage and check stage of a machine learning model in one modification of the method for setting a lighting condition shown in FIG. 7;

FIG. 9 is a flowchart of a method for setting a lighting condition according to another implementation mode of the present disclosure; and FIG. 10 is a flowchart of a method for setting a lighting condition according to another implementation mode of the present disclosure.

DETAILED DESCRIPTION OF THE EMBODIMENTS

In sequence to make those skilled in the art better understand the present disclosure, the implementation modes of the present disclosure are clearly and completely described below in combination with the accompanying drawings of the present disclosure. Apparently, the described implementation modes are merely a part of the implementation modes of the present disclosure, rather than all of the implementation modes. All other implementation modes obtained by those skilled in the art based on the implementation modes in the present disclosure, without creative efforts, shall fall within the protection scope of the present disclosure.

In the present disclosure, for example, objects may be captured in advance under all adoptable imaging conditions, and appropriate images may be selected according to desired set conditions. An advantage is that there is no limitation so far as the imaging conditions are discretized. In addition to the lighting pattern, it may also change the aperture and the shutter speed and so on. In addition, in case of continuous imaging conditions, discretization may be made. Furthermore, on the assumption that when the number of the workpieces is M and the number of imaging conditions is N, M*N pieces of images are obtained, which may be stored in storages, server side or cloud side.

In the present disclosure, an object is lighted by multiple light sources with variable lighting parameters. The lighting parameters may include, for example, luminous positions, luminous intensity and chromaticity of the light sources. Under a lighting condition, the object is captured by an image sensor (for example, a camera) to obtain captured images. A machine learning model is trained by using the captured images, the corresponding lighting parameters and the label data of the object, so as to endow the machine learning model with a capability of checking the object. The captured images may be associated with the lighting parameters in advance, so that the lighting parameters and check algorithm parameters may be regulated at the same time in a process of training the machine learning model. Here, "check algorithm parameters" refer to parameters of a check algorithm when checking an object by a machine learning model. Therefore, compared with pure regulation of the lighting parameters and lighting with the lighting parameters for obtaining the captured images for learning, the method for checking the object in the present disclosure simplifies operations and reduces a system load.

The implementation modes of the present disclosure are described with reference to the accompanying drawings in detail. It is important to note that the same or corresponding parts in the drawings are marked with the same marks and will not be repeatedly described.

At first, a system composition example of a check system 1 according to an implementation mode of the present disclosure is described. The check system 1 according to the implementation mode checks a checked object on the basis of captured images generated by capturing the checked object. The checked object may be a workpiece on a production line. Checking may be, for example, appearance checking or appearance measurement over the workpiece.

Figure 1:
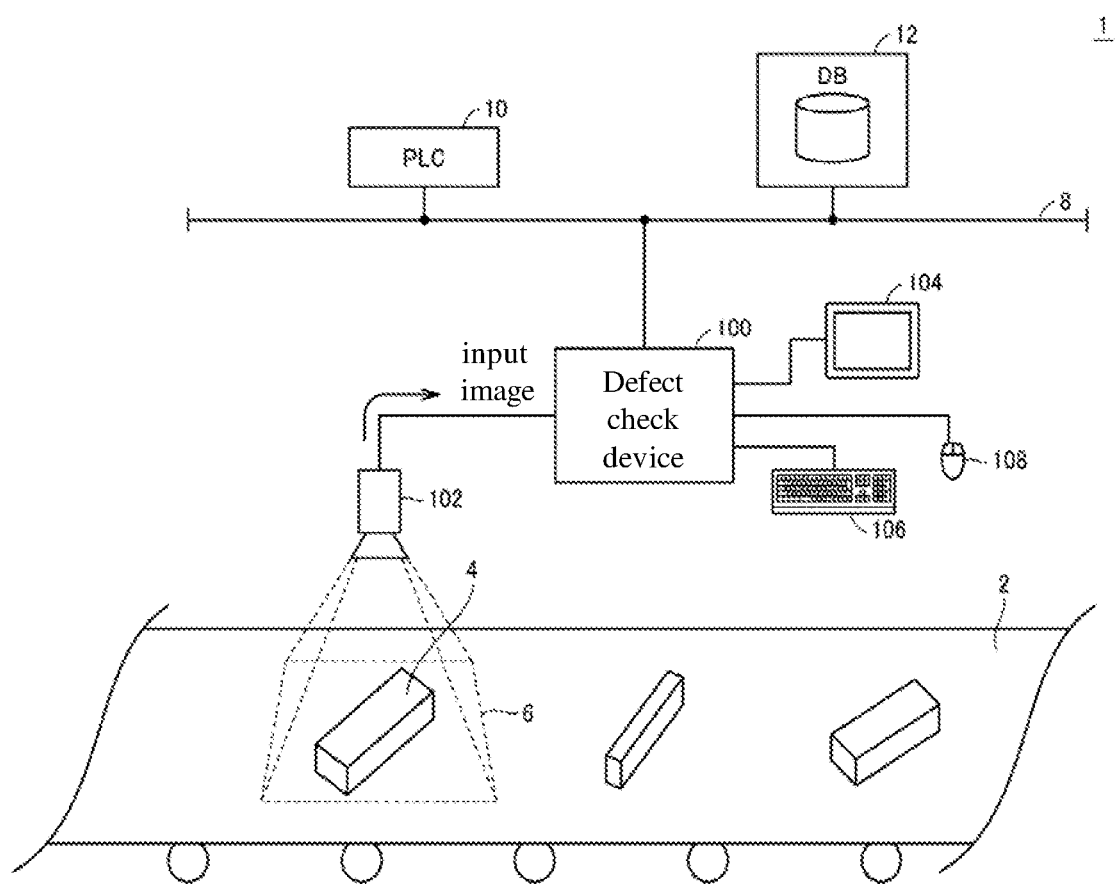
FIG. 1 is a schematic diagram of a system composition example of a check system according to an implementation mode of the present disclosure.

FIG. 1 is a schematic diagram of the system composition example of the check system 1 according to the implementation mode. Referring to FIG. 1, the check system 1 executes image analysis processing on an input image obtained by imaging, the checked object, i.e., the workpiece 4, for example, conveyed on a belt conveyor 2, thereby completing appearance checking or appearance measurement over the workpiece 4. In the descriptions made below, an application example of checking whether there exists a defect in a surface of the workpiece 4 is described as a typical example of image analysis processing. However, these do not form any limit, and the check system may further be applied to specification of a defect type, or measurement of an appearance shape or the like.

An upper portion of the belt conveyor 2 is provided with a camera 102 serving as an imaging portion, and an imaging view 6 of the camera 102 forms a predetermined region including the belt conveyor 2. Image data (called as an "input image" hereinafter) generated by imaging of the camera 102 is sent to a defect check device 100. Imaging of the camera 102 is executed according to a period or an event.

The defect check device 100 may be provided with a learner, and the learner may be provided with a Convolutional Neural Network (CNN) engine. By the CNN engine, a feature detection image of each level is generated according to the input image. Whether there exists a defect in the object workpiece or not is judged on the basis of the one or more feature detection images which are generated. Or, a size, position or the like of the defect may be detected.

The defect check device 100 is connected with a Programmable Logic Controller (PLC) 10, a database device 12 and the like through an upper network 8. A detection result in the defect check device 100 may also be sent to the PLC 10 and/or the database device 12. It is important to note that, besides the PLC 10 and the database device 12, any device may also be connected to the upper network 8.

A display 104 for displaying a processing state, the detection result or the like and a keyboard 106 and mouse 108 serving as input portions receiving an operation of a user may further be connected to the defect check device 100.

Second, a hardware composition of a defect check device 100 included in a check system 1 according to an implementation mode of the present disclosure is described.

Figure 2:
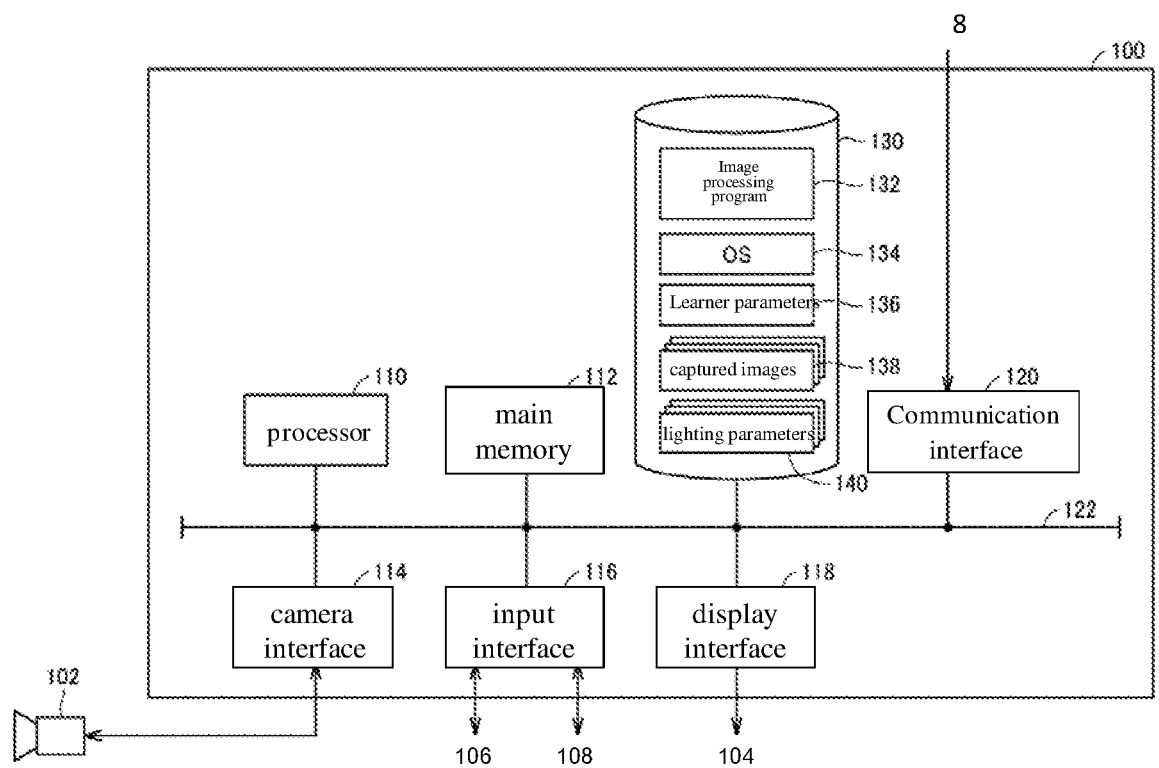
FIG. 2 is a schematic diagram of a hardware composition of a defect check device according to an implementation mode of the present disclosure.

FIG. 2 is a schematic diagram of the hardware composition of the defect check device 100 according to the implementation mode. The defect check device 100 may be an example of a "system for setting a lighting condition when an object is checked" in the present disclosure. Referring to FIG. 2, as an example, the defect check device 100 may be implemented according to a universal computer formed by a universal computer architecture. The defect check device 100 includes a processor 110, a main memory 112, a camera interface 114, an input interface 116, a display interface 118, a communication interface 120 and a memory 130. Typically, these components are connected through an internal bus 122, thereby communicating with one another.

The processor 110 executes a program stored in the memory 130 in the main memory 112, thereby realizing functions and processing described hereinafter. The main memory 112 is formed by a nonvolatile memory, and realizes a function of a working memory required by program execution of the processor 110.

The camera interface 114 is connected with a camera 102, and acquires an input image obtained by imaging of the camera 102. The camera interface 114 may further indicate an imaging timing and the like to the camera 102.

The input interface 116 is connected with the input portions such as the keyboard 106 and the mouse 108, and acquires an instruction represented by an operation of a user over the input portions and the like.

The display interface 118 is connected with the display 104, and outputs various processing results generated by program execution of the processor 110 to the display 104.

The communication interface 120 is responsible for processing of communicating with a PLC 10, a database device 12 and the like through an upper network 8.

The program enabling a computer such as an image processing program 132 and an Operating System (OS) 134 to realize the function of the defect check device 100 is stored in the memory 130. Learner parameters 136 configured to implement image detection processing, input images, i.e., captured images 138, acquired from the camera 102 and lighting parameters 140 of light sources when the workpiece 4 is captured, which are mentioned hereinafter, may further be stored in the memory 130. The learner parameters 136 may include, for example, various parameters applied to a learning stage and check stage of a machine learning model such as lighting parameters and check algorithm parameters.

The image processing program 132 stored in the memory 130 may be installed in the defect check device 100 through an optical recording medium such as a Digital Versatile Disc (DVD) or a semiconductor recording medium such as a Universal Serial Bus (USB) memory. Or, the image processing program 132 may further be downloaded from a server device on a network and the like.

During implementation with such a universal computer, processing may be performed by calling necessary software modules in software modules provided by the OS 134 according to a predetermined sequence and/or opportunity, thereby realizing a part of functions according to the implementation mode. That is, the image processing program 132 according to the implementation mode does not include all software modules for realizing the functions according to the implementation mode, and may provide necessary functions by cooperating with the OS.

The image processing program 132 according to the implementation mode may further be provided by being combined in a part of another program. Under such a condition, the image processing program 132 does not include modules included in the other program which is combined, and cooperates with the other program to execute processing. Therefore, the image processing program 132 according to the implementation mode may further adopt a manner of combination in the other program.

FIG. 2 shows an example of implementing the defect check device 100 by virtue of the universal computer. However, no limits are formed. A part or all of the functions may also be realized through a dedicated circuit (for example, an Application Specific Integrated Circuit (ASIC) or a Field-Programmable Gate Array (FPGA)). Moreover, an external device connected with the network may also be responsible for a part of processing.

Figure 3:
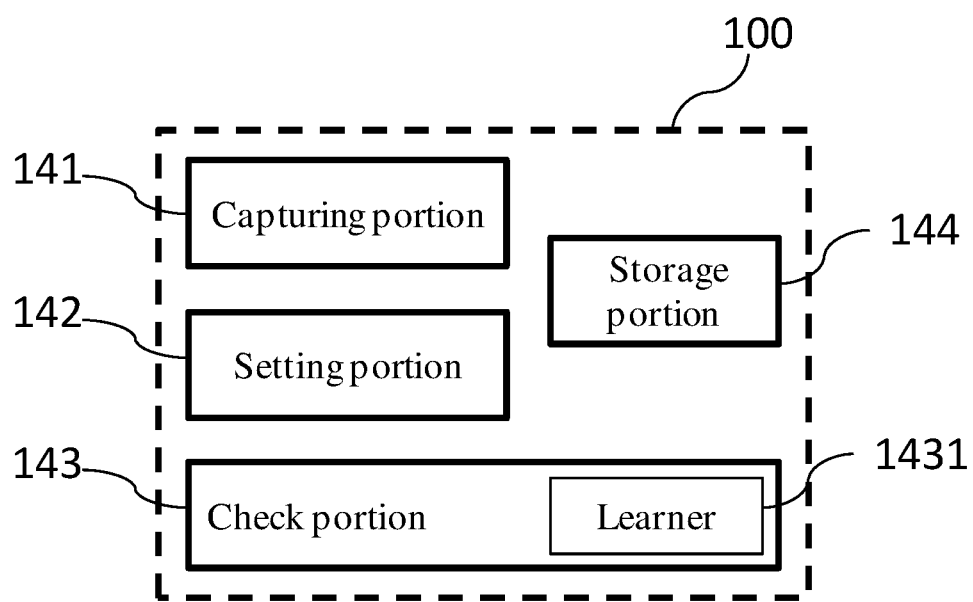
FIG. 3 is a schematic diagram of functional modules of a defect check device according to an implementation mode of the present disclosure.

FIG. 3 is a schematic diagram of functional modules of a defect check device 100 according to an implementation mode of the present disclosure. As shown in FIG. 3, the defect check device 100 may include a capturing portion 141, a setting portion 142, a check portion 143 and a storage portion 144.

The capturing portion 141, the setting portion 142 and the check portion 143 of the defect check device 100 may be implemented by virtue of one or more universal processors. However, no limits are formed. A part or all of the functions may also be realized through a dedicated circuit (for example, an Application Specific Integrated Circuit (ASIC) or a Field-Programmable Gate Array (FPGA)). Moreover, an external device connected with the network may also be responsible for a part of processing of these portions.

Here, the capturing portion 141 is a specific example of an "acquisition portion" in the present disclosure. As another example, the defect check device 100 may also not include the capturing portion 141, and externally receives a captured image of a workpiece 4. The setting portion 142 is a specific example of a "setting portion" in the present disclosure. A combination of the capturing portion 141 and the setting portion 142 is a specific example of a "device for setting a lighting condition when an object is checked" in the present disclosure.

In addition, the check portion 143 is a specific example of a "check module" in the present disclosure. A learner 1431 is a specific example of an implementation mode of a "machine learning model" in the present disclosure. The check portion 143 outputs a final check result about the workpiece 4. For example, under the condition that the learner 1431 is a CNN configured to generate a feature extracted from an image, the check portion 143 may further include, for example, a determination device applying a determination reference to the feature extracted by the learner 1431 to generate the final check result.

The setting portion 142 applies a part of or all of multiple captured images corresponding to multiple lighting parameters and corresponding label data of the workpiece 4 to learning of the learner 1431, and sets the lighting parameter used when the check portion 143 checks the workpiece 4 by virtue of the learner 1431 which has performed learning on the basis of a comparison result between an estimation result of the learner 1431 and the label data of the workpiece. A setting method will be described below in detail.

The "label data" herein is configured to represent checked features of the workpiece 4. For example, the label data may be data representing whether the workpiece 4 is an accepted product or a rejected product, and may also be data representing appearance features (for example, scratches and size) of the workpiece 4. The content of the label data is not specifically limited, as long as expected checked features of the workpiece 4 are represented.

The check portion 143 checks the workpiece 4 on a belt conveyor 2. The check portion 143 may include the learner 1431, thereby checking the workpiece 4 through a trained machine learning model.

The capturing portion 141 captures the workpiece 4 through an image sensor. The image sensor may be, for example, a camera, there may be one or more cameras, and moreover, their capturing parameters such as aperture sizes and shutter speeds are variable.

The storage portion 144 is configured to store a program or data required by work of the defect check device 100. The defect check device 100 may also not include the storage portion 144.

A method for setting a lighting condition according to an implementation mode of the present disclosure will be summarized below with reference to FIG. 4. (a) and (b) of FIG. 4 are respectively flowcharts of a learning stage and check stage of a machine learning model in a method for setting a lighting condition according to an implementation mode of the present disclosure.

As shown in (a) of FIG. 4, in Step S410, a capturing portion 141 captures a workpiece. The workpiece may be captured for many times under the condition of lighting with different lighting parameters, thereby obtaining multiple captured images about the workpiece. These captured images correspond to a set of lighting parameters respectively, and for example, each set of lighting parameters may include parameters such as light sources which are turned on and luminance of the light sources which are turned on.

For example, assuming the index for identifying the workpieces is i ($1 \leq i \leq M$), the set of N imaging conditions (lighting parameters, camera parameters) to be candidates is represented as $\{\theta_L^j\}_{j=1}^N$. Thus, all the workpieces are captured under all imaging conditions, and the images thereof are stored in the storage portion 144. The stored M*N pieces of images are represented as $$\{u_{i,j}\}_{i=1, j=1}^{M,N}.$$

Here, the lighting parameters of each light source may be changed. For example, a luminous position and/or luminous intensity of each light source may be changed, so that different lighting may be provided for the workpiece 4. Moreover, the workpiece 4 has corresponding label data, and the label data is configured to represent checked features of the workpiece 4. For example, the label data may be data representing whether the workpiece 4 is an accepted product or a rejected product, and may also be data representing appearance features (for example, scratches and size) of the workpiece 4. A content of the label data is not specifically limited, as long as expected checked features of the workpiece 4 are represented.

In Step S412, a learner 1431 performs learning by virtue of these captured images and the corresponding label data. Since each captured image has an associated lighting parameter, by learning, an evaluation function may be optimized to obtain optimal lighting parameters and check algorithm parameters, that is, the optimal lighting parameters and check algorithm parameters are selected to optimize a correct ratio of a check result output by a check portion 143. Here, the "lighting parameters" refer to lighting parameters used when the check portion 143 checks the workpiece, and the "check algorithm parameters" refer to parameters of a check algorithm used when the check portion 143 checks the workpiece.

In the present disclosure, the check algorithm is implemented by the learner 1431. A training evaluation reference of the learner 1431 is usually called as a Loss value, and if an accepted/rejected product judgment problem is involved, a correct ratio of PASS/FAIL is represented by Cross Entropy and the like. If a check content is a regression problem of measurement of a length and the like of a workpiece 4, an error occurrence distribution is modeled through multidimensional normal distribution, and its logarithm likelihood function is used as the Loss value.

Under a general condition, during learning of a machine-learning-based check algorithm, multiple pieces of teacher data (PASS/FAIL in case of the judgment problem and correct ratio in case of the regression problem) and learning sample images are input in advance, and parameter optimization is performed in a manner of minimizing the Loss value, wherein the Loss value is a reference of whether these learning sample images are correctly estimated or not.

As shown in (b) of FIG. 4, in Step S420, lighting is performed with the optimized lighting parameters obtained in Step S412, and the capturing portion 141 captures the workpiece 4 to obtain captured images. In Step S422, the learner 1431 checks a defect of the workpiece 4 by virtue of these images.

In the method for setting the lighting condition shown in FIG. 4, the check lighting parameters and the check algorithm parameters are regulated at the same time, that is, the lighting parameters are equivalently added into the algorithm parameters required to be regulated, so that labor hours may be reduced, dependence on a worker is reduced, moreover, a calculation load of the whole system is reduced, and check efficiency is improved.

FIG. 5 is a flowchart of a method for setting a lighting condition after Step S412 of the method for setting the lighting condition shown in (a) of FIG. 4 is further detailed. FIG. 6 is a schematic flowchart of the method for setting a lighting condition shown in FIG. 4 and FIG. 5.

Referring to FIG. 5, in Step S50, learning data including the captured images and the corresponding label data of the workpiece 4 is applied to learning of the learner 1431, wherein the label data represents the checked features of the workpiece 4.

In Step S52, the check algorithm parameters of the learner 1431 are optimized to make an estimation result of the learner 1431 consistent with the label data.

During appearance checking, a Loss function of the machine-learning-based check algorithm is usually marked as $L(u,v|\theta_D)$, wherein $\theta_D$ is a parameter vector of the check algorithm, for example, the check algorithm includes all weights of connecting lines during deep learning. Moreover, u is the captured image, and v is a label of the image. Under a general condition, when a data set for learning is represented as $\{(u_i,v_i)\}_{i=1}^M$, an optimal learning parameter $\hat{\theta}_D$ is calculated through formula (1):

$$\hat{\theta}_D = \underset{\theta_D}{\operatorname{argmin}} \sum_{i=1}^M L(u_i, v_i | \theta_D). \tag{1}$$

Then, the optimal imaging conditions and the optimal check algorithm parameters may be calculated through the following formula (2) by using the M*N pieces of images $$\{u_{i,j}\}_{i=1,j=1}^{M,N}.$$

$$(\hat{j}, \hat{\theta}_D) = \underset{j,\theta_D}{\operatorname{argmin}} \sum_{i=1}^M L(u_{i,j}, v_i | \theta_D). \tag{2}$$

With these results, it is possible to determine that the optimal imaging parameter is $\theta_L^{(\hat{j})}$ (corresponding to the imaging condition with index $\hat{j}$). In the operation phase, for example, in step S422, the calculated optimal imaging parameter may be used for checking the workpieces.

In the method for setting the lighting parameters according to the implementation mode of the present disclosure with reference to FIG. 4 and the method for setting the lighting parameters according to the implementation mode of the present disclosure with reference to FIG. 5, the check lighting parameters and the check algorithm parameters are optimized at the same time, so that labor hours may be reduced, and moreover, direct optimization of the evaluation reference may be implemented only from the angle of checking accuracy (accepted/rejected product judgment or measured value). In addition, direct optimization of a capturing system and an image processing system for a purpose as a whole may be implemented, for example, a good lighting design for check algorithms and the check algorithm most suitable for such lighting.

Moreover, in the method for setting the lighting condition, there is no limitation so far as the imaging conditions are discretized. In addition, it does not need to provide means for estimating images based on lighting parameters such as "lighting simulator".

In the present disclosure, each workpiece is captured under all discretized imaging conditions in advance, thus the number of the captured images is large. Moreover, in case that imaging conditions are constituted by many independent conditions (lighting parameters or shutter speed, aperture and so on), there is a quantity of combinations, the number of capturing will be further increased. Therefore, as a modification of the present disclosure, a plurality of approximate imaging conditions may be combined into one and substituted with a representative condition. Particularly, it can be achieved through vector quantization compression. Imaging conditions to be candidate may be determined by appropriately defining a function defining the proximity between imaging conditions and using an arbitrary clustering technology such as K-Means.

As shown in FIG. 6, for example, in the case where the learner 1431 performs depth learning using a neural network, the output of the neural network is made to be consistent with the label data so that the check algorithm parameters and the lighting parameters are optimized at the same time, and thereby a neural network which has already performed learning and has optimal lighting parameters can be obtained. The learner 1431 which has already performed learning can select lighting parameters to increase the correct ratio of the test result of the workpiece 4.

(a) and (b) of FIG. 7 are respectively flowcharts of a learning stage and check stage of a machine learning model in a method for setting a lighting condition according to another implementation mode of the present disclosure. A principle of the method is described below at first.

Under a general condition, learning of a machine-learning-based check algorithm requires a large number of training images. This problem is particularly obvious in a method with a large number of parameters such as deep learning, wherein the problem is that M*N images are required to be obtained in the method. When a value of M is very large, a large number of images are required to be captured.

As a solution to the problem, check algorithm parameters may be calculated in advance through training images obtained under a fixed capturing condition only for the check algorithm requiring a large number of training images. In other words, j and $\theta_D$ are not changed at the same time to calculate an optimal solution, rather, the imaging conditions are calculated by changing index j of the imaging conditions for fewer workpieces after $\theta_D$ is calculated. Here, the "imaging conditions" include not only lighting conditions, but also capturing conditions, etc. Under a general condition, this method may be considered to be reasonable because a number of lighting parameters is relatively small.

Specifically, two data sets $D_1=\{(u_i^{(1)}, v_i^{(1)})\}_{i=1}^{M_1}$ and $D_2=\{(u_{i,j}^{(2)}, v_i^{(2)})\}_{i=1}^{M_2}$ are prepared, and for optimization of two stages, optimal lighting parameters are calculated by formula (3) and formula (4):

$$\hat{\theta}_D = \underset{\theta_D}{\arg\min} \sum_{i=1}^{M_1} L(u_i^{(1)}, v_i^{(1)} | \theta_D), \text{ and} \quad (3)$$

$$\hat{j} = \arg\min_j \sum_{i=1}^{M_2} L(u_{i,j}^{(2)}, v_i^{(2)} | \hat{\theta}_D). \quad (4)$$

In the foregoing method, it is set that $M_1 > M_2$, a number of captured images required by learning may be reduced from M*N to $M_1 + M_2 \times N$. In the foregoing method, existing fixed check algorithm parameters may also be used, and only lighting parameters are calculated.

A flow of the method is described herein with reference to FIG. 7 in detail. As shown in (a) of FIG. 7, in Step S710, $M_1$ workpieces are captured with fixed lighting parameters to obtain $M_1$ captured images. In Step S712, a learner 1431 performs learning by the $M_1$ captured images to optimize check algorithm parameters. In Step S714, $M_2$ workpieces in the $M_1$ workpieces are captured under N types of lighting parameters to obtain $M_2$*N captured images.

In Step S716, the $M_2$*N captured images are applied to the learner 1431 which has performed learning, and the lighting condition adopted when a check portion 143 checks the workpiece 4 is set on the basis of a comparison result between an estimation result of the learner 1431 and the label data. As an example of the comparison, for example, after the learner 1431 has already performed learning using a workpiece image under N lighting parameters as a test image input, a lighting parameter that maximizes the correct ratio of the estimation result of the learner 1431 is selected as the lighting parameter used when checking the workpiece 4.

After the learning stage shown in (a) of FIG. 7, as shown in (b) of FIG. 7, in Step S720, the workpiece is captured under check lighting parameters to obtain captured images. In Step S722, the check portion 143 analyzes the captured images to obtain a detection result about the workpiece.

According to the check method described with reference to FIG. 7, a system calculation amount during learning of a machine learning model may be reduced, a system load may be reduced, and a setting operation over the lighting parameters may be simplified.

In addition, optionally, in the foregoing method, the number of the captured images required by learning may also be reduced, thereby reducing labor hours and simplifying a parameter optimization procedure.

There may be various modifications for the method for setting a lighting condition described with reference to FIG. 7, and the modifications will be described in detail below with reference to FIG. 8. (a) and (b) of FIG. 8 are respectively flowcharts of a learning stage and check stage of a machine learning model in one modification of the method for setting a lighting condition shown in FIG. 7. In FIG. 8, the same or similar steps as those of FIG. 7 are marked with the same or similar reference numerals, and repeated description thereof is omitted.

During learning in Step S816, besides $\theta_L$, a part (recorded as $\theta'_D$) of the check algorithm parameters is also set to be a variable value, and is regulated again, as shown in formula (5) and formula (6). Therefore, additional learning may be executed only by the captured images of a few workpiece samples, and on the other aspect, the problem of incapability of forming a learner most suitable for lighting may be locally solved:

$$\hat{\theta}_D = \underset{\theta_D}{\arg\min} \sum_{(u,v) \in D_1} L(u, v | \theta_D), \text{ and} \quad (5)$$

$$(\hat{j}, \hat{\theta}'_D) = \underset{j, \theta'_D}{\arg\min} \sum_{(f,v) \in D_2} L(f, v | \theta_L, \hat{\theta}_D). \quad (6)$$

Similarly, the number of the captured images required by learning may be reduced, and moreover, the learner most suitable for lighting to a certain extent may be formed.

Moreover, in the check method described with reference to FIG. 8, all the parameters of the check algorithm may also be regulated again during learning in Step S816. Under such a condition, learning in Step S712 has a pretraining function.

FIG. 9 is a flowchart of a check method according to another implementation mode of the present disclosure. According to the check method described with reference to FIG. 9, robustness for small changes of a lighting and imaging system may be improved.

When the same check is performed on a production line in parallel, it is difficult to manufacture a copy completely the same as the whole imaging system including lighting. Under a general condition, there may be an individual difference due to a deviation of a mounting position of a camera or lighting and the like.

When the optimal lighting parameters calculated by the method of the present disclosure are applied to a copy environment different from a capturing environment, performance may be damaged due to an individual difference of the imaging system. For preventing this problem, stable parameters may be calculated for small changes by an evaluation function of performing averaging after noise is added into the lighting parameters. Specifically, the foregoing Loss function L is replaced with $L_\varepsilon$ defined in formula (7), thereby calculating the lighting parameters and the check algorithm parameters:

$$L_\varepsilon(u_{i,j}, v_i | \theta_D) = \sum_{k \in \varepsilon(j)} L(u_{i,j}, v_i | \theta_D), \quad (7)$$

wherein ε(j) is a set of indexes of imaging conditions approximately to imaging condition $\theta_L^{(j)}$. Here, "approximately" is arbitrary, for example, adjacent values within the discretized imaging conditions, or a certain Euclidean distance may be used to define it. This is direct application of the concept of "Augmentation" of an input image during deep learning to the lighting parameters.

The flow of the method is described herein with reference to FIG. 9 in detail. As shown in FIG. 9, in Step S90, the workpiece is captured to obtain captured images. The step may refer to S410. In Step S92, the captured images are input into the learner 1431, and a lighting variation condition is further input for learning. The "lighting variation condition" mentioned herein may include the small changes of the environment, and may further include small changes of light sources and an image sensor. In Step S94, a loss average of a loss function of the learner 1431 for the lighting parameters within a predetermined range is minimized to obtain optimized lighting parameters, wherein the lighting parameters are variables of the loss function.

In the check method described with reference to FIG. 9, environmental influence is considered, so that the robustness for small changes of the lighting parameters may be improved, and performance of the whole check system is improved.

FIG. 10 is a flowchart of a check method according to another implementation mode of the present disclosure. According to the check method described with reference to FIG. 10, robustness for changes of a workpiece may be improved on the basis of two evaluation functions.

For ensuring the robustness of check performance for the changes of the workpiece, under a general condition, there exist modifications of adding workpiece sample images or adding the sample images by applying an enhancement technology.

According to the present disclosure, there is achieved the advantage that a correct ratio (Loss value) of a check algorithm may be directly maximized. On the other aspect, no reference for directly visually evaluating captured images is included, it is impossible to distinguish whether lighting parameters are turned into lighting parameters of practical lighting for checking a defect of an object or unusual lighting parameters which are optimized for a specified workpiece configuration. When a check image is evaluated to be good or not by eyes, performance of the check algorithm may not be directly maximized, but evaluation is performed on the basis of a feeling of a human and priori knowledge of experiences, so that the advantage of ensuring the robustness is achieved. Therefore, as shown in formula (8), a human-based subjective faculty evaluation reference h(u) (for example, contrast in a region) may be added to the Loss function to implement optimization:

$$L'(u_{i,j}, v_i | \theta_L, \theta_D) = L(u_{i,j}, v_i | \theta_L, \theta_D) + \lambda h(u_{i,j}) \quad (8),$$

where λ is a balance parameter determining the one importance should be attached to in the performance (Loss value) of the check algorithm and the faculty evaluation reference.

The flow of the method is described herein with reference to FIG. 10 in detail. As shown in FIG. 10, in Step S100, the workpiece is captured to obtain captured images. The step may refer to S410. In Step S102, the captured images are input into the learner 1431, and an evaluation reference is further input for learning. The "evaluation reference" mentioned herein may include the foregoing evaluation reference based on the feeling of the human and the priori knowledge of experiences, and may also include an evaluation reference based on an existing mathematical algorithm for image analysis and the like. In Step S104, the loss function of the learner 1431 is minimized to obtain optimized check lighting parameters.

As a manner applying the method, it may have the following transformations. For example, in the simplified method of calculating j after $\theta_D$ is calculated, in the step of calculating each parameter, different λ values or faculty evaluation references h(u) may be adopted. For example, $\theta_D$ is calculated only according to the correct ratio (λ=0) and a weight of the faculty evaluation reference is increased for $\theta_L$ (λ is set to be a relatively large value) and the like may be adopted.

In the check method described with reference to FIG. 10, the environmental influence is considered, so that the robustness for differences of workpieces may be improved, and the performance of the whole check system is improved.

If being implemented in the form of a software functional unit and sold or used as an independent product, the device and system for setting the lighting condition when the object is checked or part of it may be stored in a computer-readable storage medium. Based on this understanding, the technical solutions of the present disclosure essentially, or the part contributing to the prior art, or all or part of the technical solutions may be implemented in the form of a software product, and the computer software product is stored in a storage medium, including several instructions for causing a piece of computer equipment (which may be a personal computer, a server or network equipment) to execute all or part of the steps of the method according to each example of the present disclosure. The foregoing storage medium includes various media capable of storing program codes such as a USB disk, a Read-Only Memory (ROM), a Random Access Memory (RAM), a removable hard disk, a magnetic disk, or an optical disk, and moreover, may further include a data stream downloaded from a server or a cloud.

The foregoing is only the preferred implementation modes of the present disclosure, and it should be noted that those of ordinary skilled in the art may make some improvements and modifications without departing from the principle of the present disclosure. These improvements and modifications should be regarded to be within the scope of protection of the present disclosure.

The invention claimed is:

1. A method for setting a lighting condition when an object is checked, wherein, a check module comprises a machine learning model is used to check the object, the machine learning model being generated by using learning data comprising images, the method is characterized by comprising:

lighting the object by light sources capable of changing lighting parameters specifying the lighting condition when the object is captured, and capturing the object by an image sensor in a plurality of lighting parameters, so as to obtain captured images corresponding to the plurality of lighting parameters, wherein, the object has known label data; and applying a part of or all of the captured images corresponding to the plurality of lighting parameters and the corresponding label data of the object to the learning of the machine learning model, and setting both the lighting condition and check algorithm parameters of the machine learning model by simultaneously optimizing both the lighting parameters and the check algorithm parameters, on the basis of a comparison result between an estimation result outputted from the machine learning model and the label data of the object.

2. A method for setting a lighting condition when an object is checked, wherein, a check module comprises a machine learning model is used to check the object, the machine learning model being generated by using learning data comprising images, the method is characterized by comprising:

lighting the object by light sources capable of changing lighting parameters specifying the lighting condition when the object is captured, and capturing the object by an image sensor in a plurality of lighting parameters, so as to obtain a plurality of captured images corresponding to the plurality of lighting parameters, wherein, the object has known label data; and applying a part of or all of the captured images corresponding to the plurality of lighting parameters to the machine learning model which has already performed learning, and setting the lighting condition by optimizing only a selection of predetermined lighting parameters on the basis of a comparison result between an estimation result outputted from the machine learning model and the label data of the object.

3. The method of claim 2, wherein, applying a part of or all of the captured images corresponding to the plurality of lighting parameters to the machine learning model which has performed learning comprises:

applying learning data comprising the captured images and the corresponding label data of the object to the additional learning of the machine learning model, so as to update a part of or all of check algorithm parameters of the machine learning model, wherein, the label data represents checked features of the object; and optimizing both the selection of the lighting parameters and a part of or all of the check algorithm parameters of the machine learning model so as to make the estimation result outputted from the machine learning model be consistent with the label data.

4. The method of claim 2, wherein,
when the lighting condition is set, the number of the captured images which are applied to the machine learning model which has already performed learning in order to find the optimal lighting condition is less than the number of the captured images which are applied to the learning of the machine learning model.

5. The method of claim 2, wherein,
the lighting parameters comprises luminous positions and luminous intensity of the light sources.

6. The method of claim 2, wherein, setting the lighting condition when the check module is used to check the object comprises:

selecting the lighting parameters that minimize the loss function representing the comparison result, wherein, the lighting parameters are variables of the loss function, wherein, selecting the lighting parameters comprises: selecting the lighting parameters that minimize the loss average of the loss function for the lighting parameters of a predetermined range.

7. A device for setting a lighting condition when an object is checked, wherein, the device is characterized by comprising:

a processor, configured to implement an acquisition unit and a setting unit, wherein a check module implemented by the processor comprises a machine learning model is used to check the object, the machine learning model being generated by using learning data comprising images;

the acquisition unit acquiring captured images regarding the object, wherein, the object being lighted by light sources capable of changing lighting parameters specifying the lighting condition when the object is captured, and the object being captured by an image sensor in a plurality of lighting parameters, so as to obtain the captured images corresponding to the plurality of lighting parameters, wherein, the object has known label data; and a setting unit, applying a part of or all of the captured images corresponding to the plurality of lighting parameters and the corresponding label data of the object to the learning of the machine learning model, and setting both the lighting condition and the check algorithm parameters of the machine learning model by simultaneously optimizing both the lighting parameters and the check algorithm parameters, on the basis of a comparison result between an estimation result outputted from the machine learning model and the label data of the object.

8. A device for setting a lighting condition when an object is checked, wherein, a check module comprises a machine learning model is used to check the object, the machine learning model being generated by using learning data comprising images, the device is characterized by comprising:

an acquisition unit acquiring captured images regarding the object, wherein, the object being lighted by light sources capable of changing lighting parameters specifying the lighting condition when the object is captured, and the object being captured by an image sensor in a plurality of lighting parameters, so as to obtain the captured images corresponding to the plurality of lighting parameters, wherein, the object has known label data; and a setting unit, applying a part of or all of the captured images corresponding to the plurality of lighting parameters to the machine learning model which has already performed learning, and setting the lighting condition by optimizing only a selection of predetermined lighting parameters on the basis of a comparison result between an estimation result outputted from the machine learning model and the label data of the object.

9. The device of claim 8, wherein, the setting unit:
applying learning data comprising the captured images and the corresponding label data of the object to the additional learning of the machine learning model, so as to update a part of or all of check algorithm parameters of the machine learning model, wherein, the label data represents checked features of the object; and optimizing both the selection of the lighting parameters and a part of or all of the check algorithm parameters of the machine learning model so as to make the estimation result outputted from the machine learning model be consistent with the label data.

10. The device of claim 8, wherein, when the lighting condition is set, the number of the captured images which are applied to the machine learning model which has already performed learning in order to find the optimal lighting condition is less than the number of the captured images which are applied to the learning of the machine learning model.

11. The device of claim 8, wherein, the lighting parameters comprises luminous positions and luminous intensity of the light sources.

12. The device of claim 8, wherein, the setting unit:

selecting the lighting parameters that minimize the loss function representing the comparison result, wherein, the lighting parameters are variables of the loss function, wherein, selecting the lighting parameters comprises: selecting the lighting parameters that minimize the loss average of the loss function for the lighting parameters of a predetermined range.

13. A system for setting a lighting condition when an object is checked, characterized by comprising: a processor, executing the method of claim 1.

14. A computer-program product, stored on a non-transitory medium, characterized in that, the computer-program product, when being executed, comprises instructions which, when executed by at least one processor, causes the processor to execute the method of claim 1.

15. A non-transitory storage medium, characterized in that, a program is stored thereon, the program, when being executed by a processor, executing the method of claim 1.

16. The method of claim 1, wherein, the lighting parameters comprises luminous positions and luminous intensity of the light sources.

17. The method of claim 1, wherein, setting the lighting condition when the check module is used to check the object comprises:

selecting the lighting parameters that minimize the loss function representing the comparison result, wherein, the lighting parameters are variables of the loss function, wherein, selecting the lighting parameters comprises: selecting the lighting parameters that minimize the loss average of the loss function for the lighting parameters of a predetermined range.

18. The device of claim 7, wherein, when the lighting condition is set, the number of the captured images which are applied to the machine learning model which has already performed learning in order to find the optimal lighting condition is less than the number of the captured images which are applied to the learning of the machine learning model.

19. The device of claim 7, wherein, the lighting parameters comprises luminous positions and luminous intensity of the light sources.

20. The device of claim 7, wherein, the setting unit:

selecting the lighting parameters that minimize the loss function representing the comparison result, wherein, the lighting parameters are variables of the loss function, wherein, selecting the lighting parameters comprises: selecting the lighting parameters that minimize the loss average of the loss function for the lighting parameters of a predetermined range.

* * * * *